(12) United States Patent
Theeg (10) Patent No.: US 9,097,853 B2
(45) Date of Patent: Aug. 4, 2015

(54) COUPLING ARRANGEMENT FOR NON-AXIAL TRANSFER OF ELECTROMAGNETIC RADIATION

(75) Inventor: Thomas Theeg, Hannover (DE)

(73) Assignee: Laser Zentrum Hannover e.V., Hannover (DE)

(*) Notice: Subject to any disclaimer, the term of this patent is extended or adjusted under 35 U.S.C. 154(b) by 222 days.

(21) Appl. No.: 13/354,475

(22) Filed: Jan. 20, 2012

(65) Prior Publication Data

US 2013/0188911 A1 Jul. 25, 2013

(51) Int. Cl.
*G02B 6/26* (2006.01)
*G02B 6/28* (2006.01)

(52) U.S. Cl.
CPC ......... *G02B 6/2835* (2013.01); *Y10T 29/49174* (2015.01)

(58) Field of Classification Search
USPC .......................................................... 385/43
See application file for complete search history.

(56) References Cited

U.S. PATENT DOCUMENTS

| | | | |
|---|---|---|---|
| 5,864,644 A | 1/1999 | DiGiovanni et al. | |
| 5,999,673 A * | 12/1999 | Valentin et al. | 385/43 |
| 6,493,492 B1 | 12/2002 | Fischer | |
| 7,016,573 B2 * | 3/2006 | Dong et al. | 385/46 |
| 7,277,612 B2 * | 10/2007 | Sintov | 385/43 |
| 7,286,283 B2 * | 10/2007 | Starodoumov | 359/341.33 |
| 7,720,340 B2 * | 5/2010 | Lewis et al. | 385/127 |
| 7,813,603 B2 * | 10/2010 | Nikolajsen | 385/39 |
| 7,813,608 B2 * | 10/2010 | Tammela et al. | 385/115 |
| 7,933,479 B2 | 4/2011 | Gonthier et al. | |
| 7,991,255 B2 * | 8/2011 | Salokatve | 385/43 |
| 2005/0094952 A1 * | 5/2005 | Gonthier et al. | 385/100 |
| 2009/0092157 A1 | 4/2009 | Gapontsev | |
| 2011/0123155 A1 | 5/2011 | Kumkar et al. | |

FOREIGN PATENT DOCUMENTS

| | | |
|---|---|---|
| EP | 0715192 | 6/1996 |
| EP | 0 893 862 | 1/1999 |
| EP | 2071375 | 6/2009 |
| WO | 96/20519 | 7/1996 |
| WO | 0203510 | 1/2002 |
| WO | 2004/112206 | 12/2004 |

OTHER PUBLICATIONS

T. Theeg, K. Hausmann, M. Frede, H. Sayinc, J. Neumann, D. Kracht. Side-pumped, tapered fiber bundle for all-fiber counter-propagating pumped high power fiber amplifiers. Conference program pp. 1,44. Photonics West 2011 / LASE, Jan. 22-27, San Francisco (2011).
T. Theeg, K. Hausmann, M. Frede, H. Sayinc, J. Neumann, D. Kracht. Side-pumped, tapered fiber bundle for all-fiber counter-propagating pumped high power fiber amplifiers. Poster session presented at Photonics West 2011 / LASE, Jan. 22-27, San Francisco, 7914-76 (2011).

* cited by examiner

*Primary Examiner* — Sung Pak
(74) *Attorney, Agent, or Firm* — Whitham Curtis Christofferson & Cook, PC (57) ABSTRACT

A coupling arrangement according to the present invention comprises a target fiber, at least one feeding fiber and an intermediate fiber. The intermediate fiber comprises an input end and a converging taper portion, wherein the input end of the intermediate fiber is spliced to an output end of the feeding fiber in an axial way. Due to this coupling electromagnetic radiation being fed through the feeding fiber enters the intermediate fiber through its input end surface. The converging taper portion of the intermediate fiber is fused to the target fiber in the transfer region in a non-axial way. This leads to a non-axial coupling such that electromagnetic radiation, which entered the intermediate fiber through the input end surface thereof, is coupled into the target fiber.

19 Claims, 4 Drawing Sheets

COUPLING ARRANGEMENT FOR NON-AXIAL TRANSFER OF ELECTROMAGNETIC RADIATION

FIELD OF THE INVENTION

The invention relates to coupling arrangements for non-axial transfer of electromagnetic radiation from at least one feeding fiber to a target fiber in a transfer region. With this kind of coupling arrangement it is possible to couple multi-mode pump fibers, which in the following are referred to as feeding fibers, into the outer cladding of single-clad or multi-clad fibers, which in the following are called target fibers.

BACKGROUND OF THE INVENTION

Multimode optical fibers are used in many applications especially for delivering optical power. One of the most interesting applications is the so called fiber laser. In the case of a fiber laser the double-clad fiber (DCF) concept is mostly used. A DCF consists of a core to guide the laser light, surrounded by a cladding to guide the multi-mode pump light. Such a DCF, which is one of the possible optical target fibers, comprises a core, which has a relatively small diameter of for example 5 to 60 µm. It has a numerical aperture, which for example can be in the range of 0.03 to 0.2. The cladding has a thickness of some 100 µm and a numerical aperture of for example in the range of 0.3 to 0.7.

The core of such a double-clad fiber (DCF) can be doped with a rare-earth element and in this case can serve as the active gain medium of the fiber laser. In order to achieve a population inversion, which is necessary for the fiber laser to work, pump radiation has to be fed into the cladding of the DCF, the so called "target fiber". But also in many other applications of these target fibers it is necessary to feed in electromagnetic radiation.

Electromagnetic pump radiation can be fed into the target fiber through an end surface or through the lateral cladding surface by either a free beam of pump radiation or through feeding fibers. From U.S. Pat. No. 5,864,644 it is known to feed in the pump radiation by feeding fibers which are usually bundled together, drawn into a taper and fusion spliced to an end surface of the target fiber. For fiber laser applications in the middle of the fiber bundle a signal fiber has to be placed to feed in or out the laser light. This technique is known as Tapered Fused Fiber Bundle (TFB) technique. This technique has two major disadvantages. The first disadvantage is the splice between the tapered fibers and the target fiber, where the fibers to be connected have to be aligned very exactly. For example, a small misalignment can lead to a strong degradation of the beam quality of the laser. The second disadvantage is the tapering process of the feeding fibers and the signal fiber to match the optical requirements of the core and the cladding of the target fiber. For example, a small taper mismatch can lead to a significant thermal load of the fiber coupler and also to a strong degradation of the beam quality of the laser. Another disadvantage is that due to existence of only two target fiber end surfaces the number of pump feeding fibers is limited. Thus, the laser power can not be simply scaled up by using more pump diodes.

These disadvantages can be overcome by feeding in the pump radiation through the cladding surface. The cladding surface is the lateral surface of the target fiber extending in longitudinal direction of the target fiber. The feeding of pump radiation through the cladding surface is called non-axial transfer. In order to achieve this, usually at least one feeding fiber is fused to the target fiber such that the cladding surfaces of both the feeding fiber and the target fiber are in optical contact with each other. To achieve an even better coupling of the pump radiation to the target fiber it is known to use feeding fibers having a converging taper portion. This means the diameter and thus the size of the cross-section of the respective fiber is progressively reduced. Using a converging taper portion of the feeding fiber is known from U.S. Pat. No. 5,999,673 and U.S. Pat. No. 7,933,479 B2.

Due to losses and inefficiencies not all of the pump radiation can be transferred from the feeding fibers into the target fiber. This lost power results in a heating of the coupling arrangement and thus limits the maximum amount of radiation power that can be transferred through a coupling arrangement. It is therefore advantageous to reduce the amount of radiation power that is not transferred into the target fiber and to ensure that this portion of the radiation power does not result in a strong heating of the coupling arrangement.

In order to achieve an optimal coupling result the numerical aperture of the feeding fiber should be smaller than or equal to the numerical aperture of the target fiber. For both the feeding fiber and the target fiber, the relevant numerical aperture is the one of the outmost layer, guiding the multi-mode pump light, of the respective fiber. For the feeding fiber this usually is the core of the feeding fiber. Hence, for better coupling results it is advantageous to remove the cladding of the feeding fiber. This unfortunately in practice is rather difficult, since in many cases both the core and the cladding consist of almost the same material differing only by some doping elements. The cladding material is often glass in order to be able to transport high radiation power through the feeding fiber and the fiber can easier withstand the deleterious effects of high temperature and humidity encountered during operation. Hence, it is difficult to remove the cladding for example using an etching technique, and stop the etching when the cladding is fully removed and the core has not been damaged. Removing the coating of the target fiber and the feeding fiber is in many cases much easier, since the coating often consists of a polymer, which can easily be removed.

In order to get good coupling results and a large radiation transfer from the feeding fiber into the target fiber even if the feeding fiber still comprises a cladding the taper-ratio has to be increased. The taper-ratio is the ratio of the diameter of the feeding fiber at the beginning of the converging taper portion and the diameter of the feeding fiber at the end of the converging taper portion. Hence, a taper-ratio of 4 means, the diameter of the feeding fiber is reduced in the converging taper portion to one forth of the original value. Increasing the taper-ratio leads to a better transfer of electromagnetic radiation from the feeding fiber into the target fiber but reduced the mechanical stability of the coupling arrangement.

A coupling arrangement as described above is usually manufactured by mounting the involved fibers in a mechanical mount and twisting the at least one feeding fiber around the target fiber. By applying a force in longitudinal direction the converging taper portion and the diverging taper portion are generated by heating of the twisted fibers. Since the fibers touch each other during the twisting, the feeding fibers get fused to the target fiber. Unfortunately the target fiber also shows a converging taper portion and a diverging taper portion after an arbitrary longitudinal irreversible extension, leading to changed optical characteristics of the fiber. In order to reduce the tapering of the target fiber as much as possible it is known from U.S. Pat. No. 7,933,479 B2 to perform a pre-tapering of the feeding fibers. This means the feeding fibers are heated and subjected to a force applied in longitudinal direction before they are mounted in the mechanical mount and twisted around the target fiber. The feeding fibers then comprise a converging taper portion and a diverging taper portion when they are mounted and thus, the extension in longitudinal direction of the twisted fibers can be reduced leading to a reduced tapering of the target fiber. The disadvantage is that the pre-tapered feeding fiber becomes very damageable due to the reduced diameter.

There is thus a need to provide coupling arrangements having a better coupling efficiency, providing better mechanical stability and being capable of transferring higher radiation power. There is further need of a method to manufacture such a coupling arrangement in an easy, cheap and reproducible way.

OBJECTS AND SUMMARY OF THE INVENTION

It is thus an object of the present invention to provide a coupling arrangement with an increased coupling efficiency even with feeding fibers comprising a glass cladding.

It is a further object of the invention to provide a coupling arrangement in which the tapering of the target fiber has less negative effects on the optical characteristics of the target fiber and the coupling arrangement.

It is still a further object of the invention to provide a method to produce a coupling arrangement leading to a smaller taper-ratio of the target fiber without the necessity to pre-taper the feeding fibers.

Other objects and advantages of the invention will be apparent from the following description thereof.

A coupling arrangement according to the present invention comprises a target fiber, at least one feeding fiber and an intermediate fiber. The intermediate fiber comprises an input end and a converging taper portion, wherein the input end of the intermediate fiber is spliced to an output end of the feeding fiber in an axial way. Due to this coupling electromagnetic radiation being fed through the feeding fiber enters the intermediate fiber through its input end surface. The converging taper portion of the intermediate fiber is fused to the target fiber in the transfer region in a non-axial way. This leads to a non-axial coupling such that electromagnetic radiation, which entered the intermediate fiber through the input end surface thereof, is coupled into the target fiber.

The feeding fiber can comprise a core and a cladding. It might also be a coreless fiber. In this case the use of an intermediate filter can be advantageous particularly if the cross sections of the feeding fiber and the intermediate fiber are different.

The target fiber can be a single or multi clad fiber. In the case of a laser or signal core the core can be single- or multi-mode, depending on the respective application in which the target fiber is needed. The target fiber can be passive or active, depending on the dopants in the core of the target fiber. The target fiber can also be a polarization maintaining or a non-polarization maintaining fiber.

The intermediate fiber has a cross-section which should be large enough to cover the full cross-section of the core of the feeding fiber. In the optimal configuration the cross-section is as small as possible to fulfill this requirement. It is nevertheless possible to choose intermediate fibers having a larger cross-section.

The intermediate fiber is usually a coreless fiber, which means that an intermediate fiber comprises a cladding and preferably an easily removable polymer coating but no additional core, made from a material that differs from the cladding material by some dopants. This leads to an improved coupling efficiency compared to a non-axial coupling between the feeding fiber and the target fiber as is known from prior art. Since this non-axial coupling takes place between the target fiber and the intermediate fiber every kind of feeding fiber can be used. The feeding fiber can for example have one or more claddings, an arbitrary diameter and an arbitrary numerical aperture. The feeding fiber is connected to the intermediate fiber for example in a thermal way, i.e. by micro gas flame, plasma source, electrical filament or laser source.

In a preferred embodiment the intermediate fiber has a non-circular cross-section such as a polygonal, in particular a hexagonal or octagonal cross-section.

In a preferred embodiment the intermediate fiber further comprises a diverging taper portion, adjacent to the converging taper portion. The intermediate fiber is not fused to the target fiber at its diverging taper portion such that there is a gap between said target fiber and the diverging taper portion of the intermediate fiber. Pump radiation, which has entered the intermediate fiber through the input end surface and is not transferred into the target fiber stays in the intermediate fiber and is led away from the target fiber through the diverging taper portion of the intermediate fiber. To ensure, that pump radiation that has already been transferred into the target fiber can not be re-transferred into the feeding fiber again a gap is provided between the target fiber and the diverging taper portion of the intermediate fiber. This also leads to a higher transfer efficiency and thus to a smaller power loss.

In another embodiment of the present invention the coupling arrangement comprises a transfer region. The target fiber comprises a core and at least one cladding. In the transfer region the target fiber is formed by an adapted fiber having an adapted fiber core and at least one adapted fiber cladding, wherein the adapted fiber core of the adapted fiber has a mode field diameter, which at least partially is larger than the mode field diameter of the target fiber outside the transfer region. In a preferred embodiment the mode field diameter of the adapted fiber core at the beginning and the end of the transfer region is larger than the mode field diameter of the adapted fiber core in a centre portion of the transfer region, while the mode field diameter of the adapted fiber core in the centre portion of the transfer region is at least as large as mode field diameter of the core of the target fiber outside the transfer region.

A coupling arrangement of this embodiment can for example be manufactured by cutting the target fiber at a particular position, thereby generating two cutting surfaces. The adapted fiber is then inserted by splicing its two ends to the respective cutting surfaces. Now, electromagnetic radiation travelling through the core of the target fiber enters the adapted fiber at a first cutting surface, travels through the adapted fiber core of the adapted fiber and re-enters the original core of the target fiber at the second cutting surface. To manage the mismatch of the optical properties of the core of the target fiber and the adapted fiber core of the adapted fiber at the transfer from the original target fiber to the adapted fiber and vice versa, a mode field matching technique can be used, such as for example thermal diffusion of the dopants. The original target fiber with the inserted adapted fiber is called target fiber in the following.

Of course the transfer region can also be located at the beginning of the target fiber. In this case the target fiber can be cut at a certain position, again leading to two cutting surfaces. As already described an adapted fiber is then inserted between these to cutting surfaces. After fusing the feeding fiber or the intermediate fiber to this transfer region the target fiber can again be cut at one of the cutting surfaces. Now the target fiber begins with the adapted fiber which is still with one end spliced to the remaining cutting surface, such that light entering the adapted fiber from the feeding or the intermediate fiber travels through this cutting surface into the target fiber. Of course it is also possible to simply splice the adapted fiber to an initial end of the target fiber, which also leads to the configuration described above.

When a target fiber is mechanically mounted and stretched in a method for manufacturing a coupling arrangement according to these embodiments of the present invention, the stretching leads to a tapering of the target fiber in particular in the region of the adapted fiber. The adapted fiber originally comprises an adapted fiber core with a larger mode field diameter than the mode field diameter of the original target fiber. By tapering this adapted fiber, its adapted fiber core also gets tapered. In a preferred embodiment of the present invention the mode field diameter of the adapted fiber in the centre portion of the transfer region is at least as large as the diameter of the core of the target fiber outside the transfer region, which is the mode field diameter of the core of the original target fiber. Due to the insertion of this special kind of adapted fiber the negative effects of the tapering of the target fiber get strongly reduced.

In a preferred embodiment the feeding fiber or an intermediate fiber, which is spliced to an output end of the feeding fiber is fused to the target fiber in the transfer region in a non-axial way. This means that the feeding fiber of the intermediate fiber is fused to the adapted fiber which forms the target fiber in the transfer region. Of course the preferred embodiments of the intermediate fiber which have been described earlier are also preferred when the intermediate fiber is fused to the adapted fiber instead of the original target fiber.

In a preferred embodiment the core and/or the cladding of the original target fiber are made from the same material as the adapted fiber core and/or the adapted fiber cladding of the adapted fiber, respectively. This ensures an optimal contact between the two fibers, leading to an optimal transfer of radiation from the original target fiber into the adapted fiber and back into the target fiber.

In yet another embodiment of the present invention the feeding fiber comprises an input end to be connected to a light source, such as a laser diode, and an opposing final end. The feeding fiber or an intermediate fiber, which is spliced to the final end of the feeding fiber, comprises a converging taper portion, which is fused to the target fiber in a non-axial way. At the final end of the feeding fiber or said intermediate fiber a mirror element is located. Between the mirror element at the final end of the respective fiber and the end of the converging taper portion a diverging taper portion is located. Electromagnetic radiation, that comes from the light source, such as the laser diode, and that is not transferred into the target fiber, stays in the feeding fiber or the intermediate fiber and reaches the final end thereof. Here, it gets reflected by the mirror element and travels back through the feeding fiber or the intermediate fiber until it again reaches the transfer region, where it again can be transferred into the target fiber. Hence, a larger portion of the electromagnetic radiation coming from the light source through the feeding fiber can be transferred and the lost amount of radiation power again gets reduced.

The ratio of forward to backward travelling light is adjustable by changing the taper-ratio of the feeding fiber or the intermediate fiber, respectively. The larger the taper-ratio is, which means the stronger the respective fiber is tapered, the larger is the amount of forward travelling light that is transferred into the target fiber.

In applications where no backward travelling light is wanted in the target fiber a pump light stripper can be located at the final end of the intermediate fiber or the feeding fiber.

Usually, a small part of the electromagnetic radiation is reflected at the final surface of the final end of the respective fiber even if no mirror element is provided. This can be prevented by using a pump light stripper.

Preferably in the transfer region the target fiber is formed by an adapted fiber in order to reduce the negative effects of the tapering of the target fiber in the transfer region as described above. The preferred embodiments of the adapted fiber are also preferred in the embodiments of the invention described here. This refers especially to the relations between the mode field diameter of the adapted fiber core of the adapted fiber and the mode field diameter of the core of the original target fiber.

In a preferred embodiment of the present invention a mode mixing element is located between the converging taper portion of the feeding fiber or the intermediate fiber and the mirror element. One reason for an electromagnetic radiation not to be transferred into the target fiber is that the radiation has a too small numerical aperture. This will not be changed when the respective radiation is reflected at the mirror element. In order to change the numerical aperture of the radiation, the mode mixing element is provided. This leads to an increased probability that the radiation will be transferred into the target fiber after being reflected at the mirror element.

If an intermediate fiber is used as described above, the intermediate fiber comprises an input end to be connected to the feeding fiber, as already described, and an opposing final end with a mirror element. Again, this intermediate fiber as the feeding fiber described above, can be fused to either an unchanged target fiber or to the adapted as described above.

In a preferred embodiment of either configuration of a coupling arrangement the at least one feeding fiber has a non-circular cross-section. The shape of the cross-section can for example be polygonal, such as hexagonal or octagonal. Of course, every other non-circular cross-section is possible, such as for example an irregular shape.

Several experiments with different shapes of the cross section were made. In one of these experiments one target fiber with a cladding diameter of 250 µm and a numerical aperture of 0.46 was used. One feeding fiber with a core diameter of 105 µm, a numerical aperture of 0.22 and a cladding diameter of 125 µm was coupled to an intermediate fiber with a diameter of 125 µm. The converging taper portion of the intermediate fiber was twisted around and fused to the target fiber. The diverging taper portion was not fused to the target fiber such that there is a gap between the target fiber and the intermediate fiber, as already described. The taper-ratio was roughly 5.6; the length of the converging taper portion was 15 mm. Without an intermediate fiber a coupling efficiency of 89% was reached. Using an intermediate fiber having a circular cross section led to a coupling efficiency of 94% while using an intermediate fiber having an octagonal cross section resulted in a coupling efficiency of nearly 98%.

Preferably the coupling arrangement comprises more than one feeding fiber. Through more than one feeding fiber more power and electromagnetic radiation can be transferred into the target fiber. In a preferred embodiment of the present invention the coupling arrangement comprises an even number of feeding fibers. Preferably the coupling arrangement has more than four, in particular six feeding fibers or intermediate fibers, respectively. Preferably every feeding fiber is connected to an intermediate fiber as described above.

According to the present invention a method for manufacturing a coupling arrangement as described above comprises the following steps:

a) Mounting the target fiber and the at least one feeding fiber or intermediate fiber in a mechanical mount at two different positions;
b) Twisting said feeding fiber or said intermediate fiber around said target fiber,
c) Applying a first force in longitudinal direction to the feeding fiber or to the intermediate fiber, applying a second force in longitudinal direction to the target fiber, wherein
   i) The first force is different from the second force.

If an intermediate fiber is to be used the intermediate fiber is spliced at the output end of the feeding fiber before it is mounted in the mechanical mount. The same is true for the case, that a mirror element and/or a mode mixing element are used. These elements should be integrated in the feeding fiber or the intermediate fiber, respectively, before the respective fiber is mounted in the mechanical mount. It is also possible to mount the feeding fiber in one position and to mount the intermediate fiber in the second position.

If an adapted fiber is to be used in the target fiber, the adapted fiber has also to be connected to the original target fiber before the target fiber is mounted in the mechanical mount.

In order to achieve a tapering of the respective fibers these fibers have to be heated. This is done after twisting the feeding fibers or the intermediate fibers around the target fiber. Hence, also the tapering takes place after the feeding fibers or the intermediate fibers have been twisted around the target fiber. In this step the fibers also get fused to each other.

Since the first force, which is applied to the feeding fiber, or if used, to the intermediate fiber, is different from the second force, which is applied to the target fiber, it is possible to reach different tapering and different taper-ratios of the different fibers. In particular it is possible to strongly reduce the tapering of the target fiber compared to the tapering of the feeding fiber or the intermediate fiber, respectively. Hence, the negative effects of the tapering of the target fiber are weakened or even fully avoided. In a preferred embodiment the target fiber is not twisted in step b. of the previously described method. This reduces mechanical tension of the target fiber, which can have negative effects on the optical characteristics of the fiber.

In addition, an external heat source is used. This means, that the heat from the heat source is provided from the outside of the respective fibers. Since at the outside of the fiber bundle the intermediate fibers or the feeding fibers are located these fibers are closer to the heat source and thus become warmer. Hence, these fibers become more malleable than the target fiber in the center of the fiber bundle. The same force applied to the target fiber and the intermediate or feeding fiber leads to a stronger tapering of the intermediate or feeding fiber. Usually the target fibre has a larger diameter than the feeding fiber or the intermediate fiber, which also leads to this effect.

In addition or alternatively, the feeding fiber or the intermediate fiber is pre-tapered before it is mounted in the mechanical mount. The pre-tapering comprises the steps of heating the respective fiber and applying a taper-force in longitudinal direction to the heated fiber. This leads to an elongation of the heated fiber and thus to a reduction of the diameter and to a tapered region. Preferably the mount used to apply the taper-force to the feeding fiber or the intermediate fiber is the same mount, which is used to apply the first force to the feeding fiber or the intermediate fiber. In this case the pre-tapered fiber does not have to be moved into a new mount. Since the mechanical stability of the pre-tapered fiber is reduced compared to the non-tapered fiber, this is a big advantage.

In the above and the following a lot of different embodiments and possible configurations of a coupling arrangement and methods for manufacturing these are described using only one feeding fiber or one intermediate fiber, respectively. Of course, each of these embodiments and methods can be used and configured using more than one feeding fiber and more than one intermediate fiber. It is for example possible to use more than one feeding fiber and to provide each or just some of them with an intermediate fiber, a mirror element and/or a mode mixing element. It is of course also possible to pre-taper all or some of the feeding fibers or intermediate fibers before mounting them in the mechanical mount.

BRIEF DESCRIPTION OF THE DRAWINGS

The invention will now be described with reference to the appended drawings, in which.

DETAILED DESCRIPTION OF THE INVENTION

Throughout the description same reference numbers are used to denote same parts.

Figure 1A:
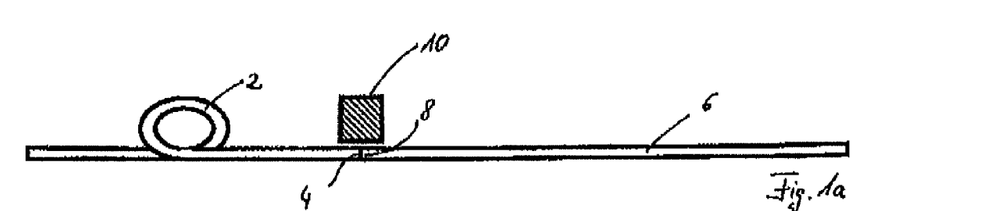
FIGS. 1a to 1d shows different steps of a method according to one embodiment of the present invention.
Figure 1B:
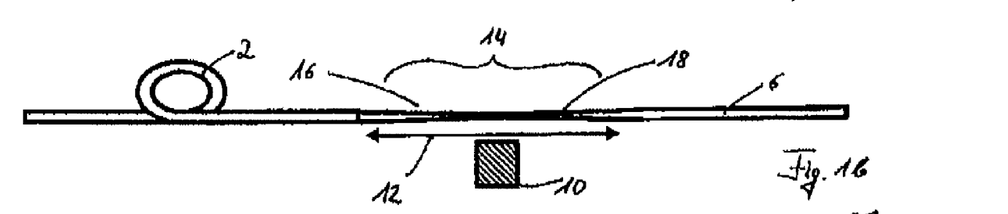

FIG. 1a to 1d show different steps of a method according to one embodiment of the present invention. FIG. 1a shows a feeding fiber 2 with an output end 4, which is connected with an intermediate fiber 6. The intermediate fiber 6 is fusion spliced to the output end 4 of the feeding fiber 2 with its input end 8. Schematically a heat source 10 is shown, which can for example be a micro gas flame, a plasma source, a filament source or a laser. The heat source 10 is used to heat the intermediate fiber 6 until a given temperature is reached. The heat source 10 can move along the longitudinal position of the intermediate fiber 6, which is to be heated. By the length of this movement the length of the converging taper portion can be adjusted. The heat source 10 moves along the intermediate fiber 6 with a certain frequency in a back and forth movement. This can be achieved by moving the heat source 10 or by moving a mount of the intermediate fiber or using a combination of both movements. Then a taper-force is applied to the intermediate fiber 6, which is denoted by the double arrow 12 in FIG. 1b. As is shown in FIG. 1b a diameter of the intermediate fiber 6 is reduced in a taper portion 14 leading to a converging taper portion 16 and a diverging taper portion 18. During the application of the taper-force the heat source 10 can still be used to heat the intermediate fiber 16, in order to keep it soft enough to be stretched and tapered.

Figure 1C:
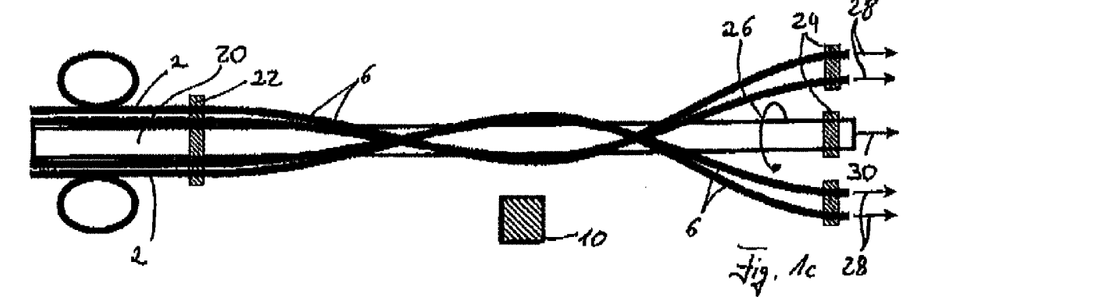

FIG. 1c shows a target fiber 20 and four intermediate fibers 6. Every intermediate fiber 6 is connected to a respective feeding fiber 2. The feeding fiber 2 and the target fiber 20 are both mounted in a mechanical mount. This comprises a first mount 22 and a second mount 24. On the left side in FIG. 1c the first mount 22 is shown. The target fiber 20 and the feeding fiber 2 are both mounted in this first mount 22 and are thus fixed relative to one another at this position.

The second mount 24 has separate fixtures for the target fiber 20 and the intermediate fibers 6. The fixture for the intermediate fibers 6 can for example have a circular shape in order to provide for a three-dimensional ordering of the different fibers. The fixture for the intermediate fibers 6 allows for a rotation relative to the fixture for the target fiber 20, which is denoted by the rotation arrow 26 in FIG. 1c. This rotation leads to the twisting of the intermediate fibers 6 around the target fiber 20, which is shown in FIG. 1c. After the twisting the different fibers touch each other and get fused to each other since the heat source 10 is used to heat the different fibers.

Since the target fiber 20 and the intermediate fibers 6 are mounted in different fixtures, that together form the second mount 24, it is possible to apply different forces to the different kinds of fibers. The intermediate fibers 6 are subjected to a first force 28, while the target fiber is subjected to a second force 30. Both the first force 28 and the second force 30 are applied in longitudinal direction and are denoted by arrows in FIG. 1c. According to the present invention the first force 28 should be chosen strong enough to get a strongly tapered intermediate fiber 6. The second force 30 should be chosen just strong enough to keep the target fiber 20 in a longitudinal straight position without extending or tapering the target fiber 20 too much. During twisting, heating and applying the force the fixture of the target fiber 20 allows for a rotation of the target fiber 20 around its longitudinal axis.

Figure 1D:
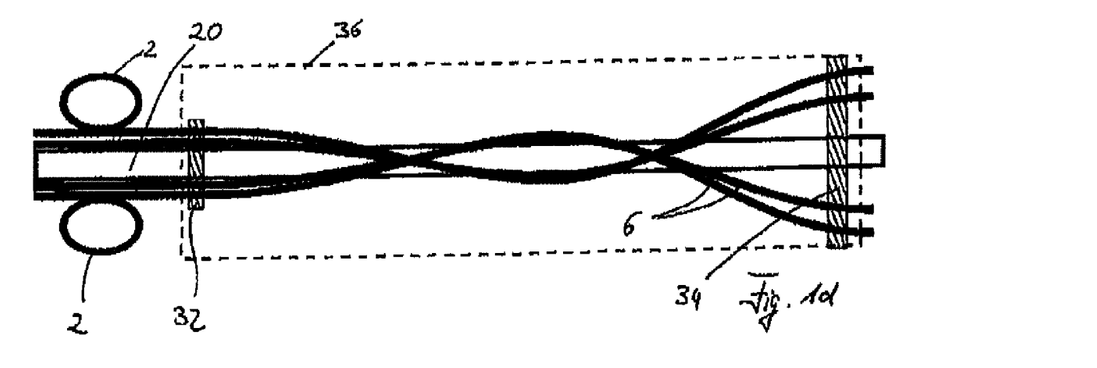

FIG. 1d shows, how the fibers are anchored and housed after cooling. The target fiber 20 and the four feeding fibers 2 are anchored in a first anchoring bond 32, while on the other side of the transfer region, which is the region, in which the different fibers touch, the target fiber 20 and the intermediate fibers 6 are anchored in a second anchoring bond 34. The coupling arrangement is then covered by a housing 36 to keep the coupling arrangement dust-free and to protect it from mechanical shocks and the like. The housing 36 is only schematically shown in form of a dotted line.

Figure 2:
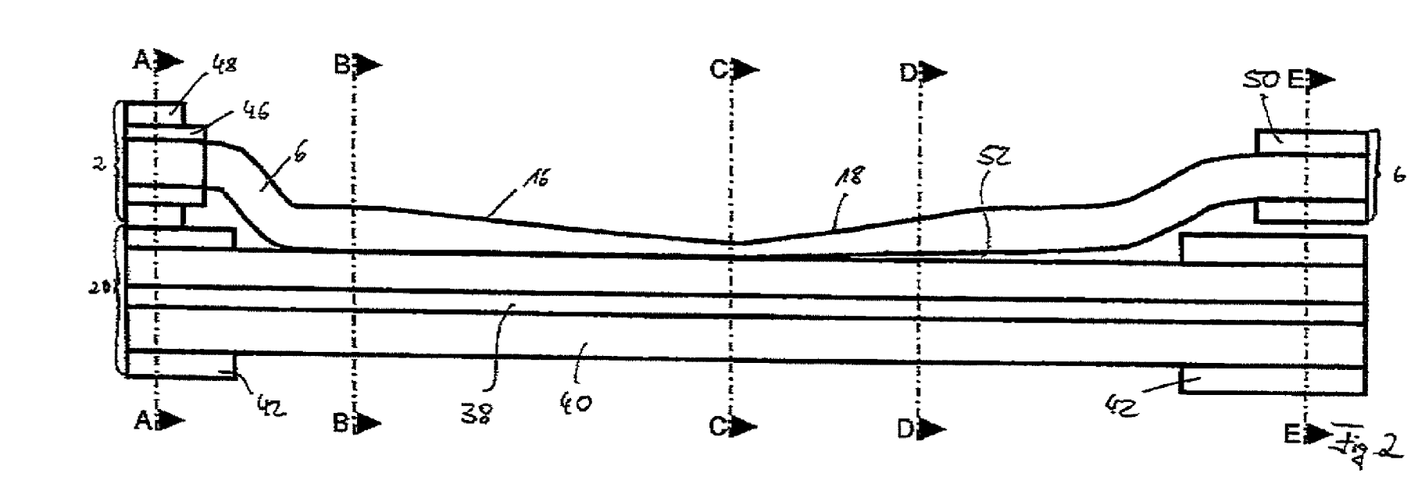
FIG. 2 shows a schematic longitudinal cross section through a coupling arrangement according to one embodiment of the present invention.

FIG. 2 shows a schematic longitudinal cross section of a coupling arrangement according to one embodiment of the present invention. The target fiber 20 comprises a core 38 in which the signal radiation is transported or amplified. The core 38 is surrounded by a cladding 40, in which the pump radiation is transported or absorbed. In the left and the right part of FIG. 2 it is shown, that the target fiber 20 also comprises a coating 42, which is removed in the centre part of FIG. 2. This part is the so called transfer region.

In the left part of FIG. 2 the feeding fiber 2 is shown, which also comprises a core 44, a cladding 46 and a coating 48. The intermediate fiber 6 without its coating 50 is fusion spliced to the feeding fiber 2 such that it connects to the core 44 of the feeding fiber 2. Electromagnetic radiation travelling through the feeding fiber 2 can thus enter the intermediate fiber 6. In the transfer region, where the target fiber 20 does no longer have a coating 42, the outer cladding surface of the intermediate fiber 6 touches the cladding 40 of the target fiber 20. The intermediate fiber 6 comprises the converging taper portion 16, with which it is fused to the target fiber 20.

Adjacent to the converging taper portion 16 the intermediate fiber 6 has a diverging taper portion 18. As is shown in FIG. 2 this diverging taper portion 18 does not touch the cladding 40 of the target fiber 20. Instead there is a gap 52 between the two fibers. This prevents radiation, which has already been transferred from the intermediate fiber 6 into the target fiber 20 to be re-transferred into the intermediate fiber 6. In the right part of FIG. 2 both fibers 20, 6 comprise a coating and do not touch anymore. In the intermediate fiber 6, the electromagnetic radiation, which has not been transferred into the target fiber 20, is led away from the coupling arrangement.

Figure 3A:
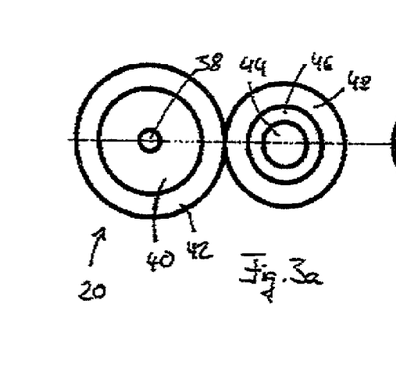
FIGS. 3a to 3e show different transversal cross sections through the coupling arrangement shown in FIG. 2.

FIG. 3a shows a schematic transversal cross-section along the line A-A in FIG. 2. In FIG. 3a one can clearly distinguish the two cores 38, 44, the two claddings 40, 46 and the two coatings 42, 48 of the target fiber 20 and the feeding fiber 2, respectively. The two coatings 42, 48 touch but no transfer or electromagnetic radiation is possible.

Figure 3B:
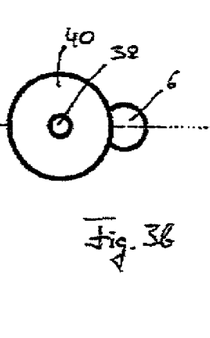

FIG. 3b shows the cross section along line B-B in FIG. 2. The target fiber 20 does not have a coating, but simply consists of the core 38 and the cladding 40. The intermediate fiber 6 does not comprise its coating 50 in the transfer region and already touches the cladding 40 of the target fiber 20. The diameter of the intermediate fiber 6 in FIG. 3b corresponds to the diameter of the core 44 of the feeding fiber 2. The cross section of the intermediate fiber 6 can also be larger than the cross section of the core 44 of the feeding fiber 2. Hence, FIG. 3b does not show the converging taper portion 16 of the intermediate fiber 6. Nevertheless a transfer of radiation from the intermediate fiber 6 into the target fiber 20 is possible.

Figure 3C:
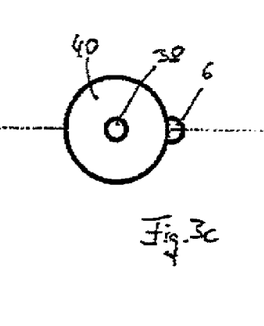

FIG. 3c shows the cross section along line C-C in FIG. 2. Again the target fiber 20 and the intermediate fiber 6 are shown. The diameter of the intermediate fiber 6 is much smaller than the one shown in FIG. 3b. Between the lines B-B and C-C in FIG. 2 is the converging taper portion 16. This is the region where the main transfer of radiation takes place.

Figure 3D:
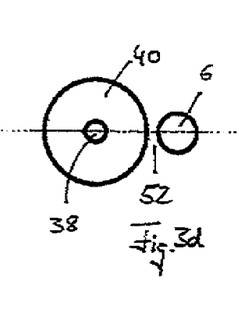

FIG. 3d shows the cross section along line D-D in FIG. 2. Here, the diameter of the intermediate fiber 6 has increased again due to the diverging taper portion 18. Between the target fiber 20 and the intermediate fiber 6 there is the gap 52 that prevents any radiation from being transferred from one fiber to another one.

Figure 3E:
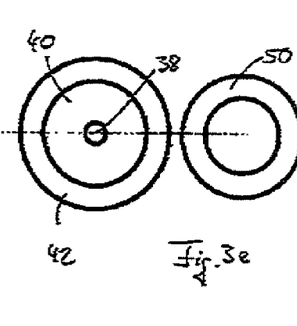

FIG. 3e shows the cross section along line E-E in FIG. 2. Both fibers comprise a coating and do not touch anymore. A transfer of radiation is clearly impossible. The intermediate fiber 6 shown in FIGS. 2, 3b to 3e has a circular cross section. This is not necessary for the invention to work. In a preferred embodiment the cross section is non-circular such as polygonal for example. This means of course not a mathematically polygonal cross section but a cross section that is polygonal within the manufacturing limits. Today, fibers having non-circular and even polygonal cross section are commercially available. These standards referring to the shape of the cross section of the respective fiber are also to be applied here.

Figure 4:
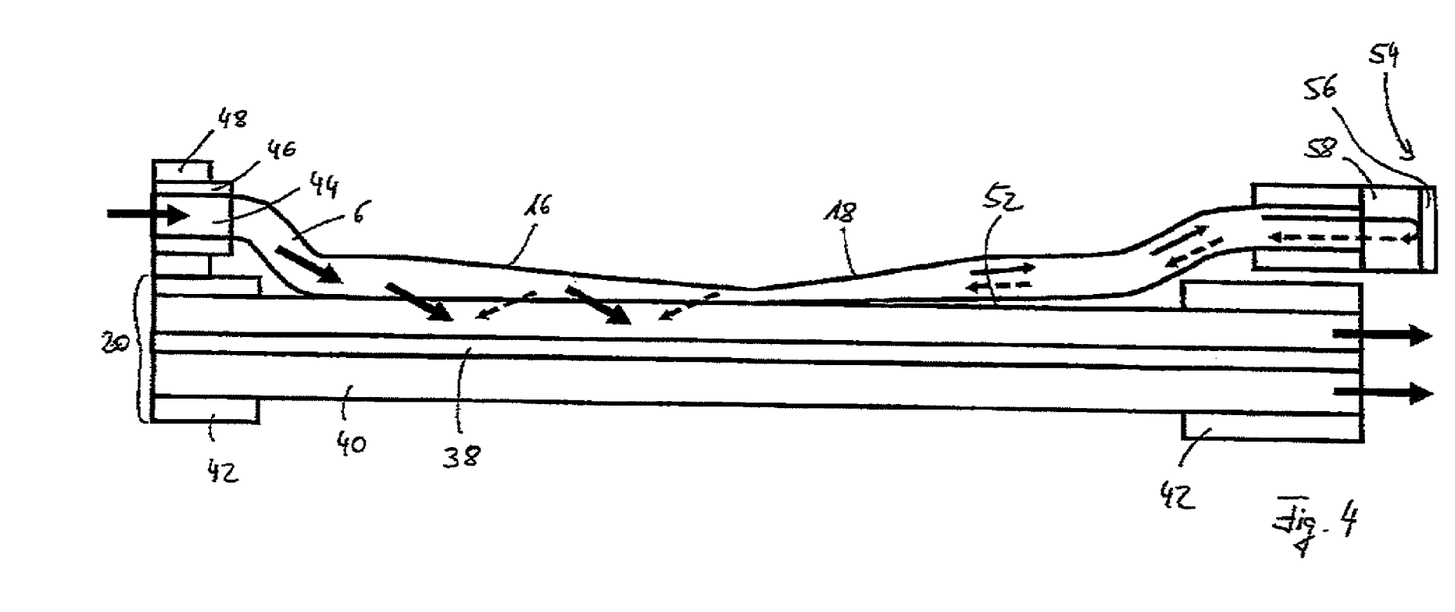
FIG. 4 shows a schematic longitudinal cross section through a coupling arrangement according to another embodiment of the present invention.

FIG. 4 shows basically the same situation as FIG. 2. Electromagnetic radiation to be transferred into the target fiber 20 enters FIG. 4 from the left through the feeding fiber 2. It then enters the intermediate fiber 6, which is spliced to an output end 4 of the feeding fiber 2. The intermediate fiber 6 comprises a converging taper portion 16. In this region the electromagnetic radiation gets transferred into the target fiber 20. Adjacent to the converging taper portion 16 there is a diverging taper portion 18 which is separated from the target fiber 20 by the gap 52. Through this part of the intermediate fiber 6 a certain portion of the radiation is transported. At a final end 54 of the intermediate fiber 6 there is a mirror element 56 at which the radiation gets reflected and sent back through the intermediate fiber 6. In front of the mirror element 56 a mode mixing element 58 is positioned. This mode mixing element 58 changes the numerical aperture of the radiation. This leads to a higher probability that the radiation after being reflected by the mirror element 56 is transferred into the target fiber 20.

The way of the radiation in the first direction, i.e. from left to right in FIG. 4 is denoted by full arrows, while the way of the radiation in the second direction after being reflected by the mirror element 56, i.e. from right to left in FIG. 4 is denoted by dashed arrows. The thickness of the respective arrows denotes the amount of radiation and the respective power in each direction, without being true to scale. This means that in the first direction a larger amount of electromagnetic radiation is transferred into the target fiber than in the second direction. Possible losses of electromagnetic radiation are not taken into account. Also the exact position of the transfer of the respective radiation is not meant to be shown by the position of the respective arrows.

Figure 5:
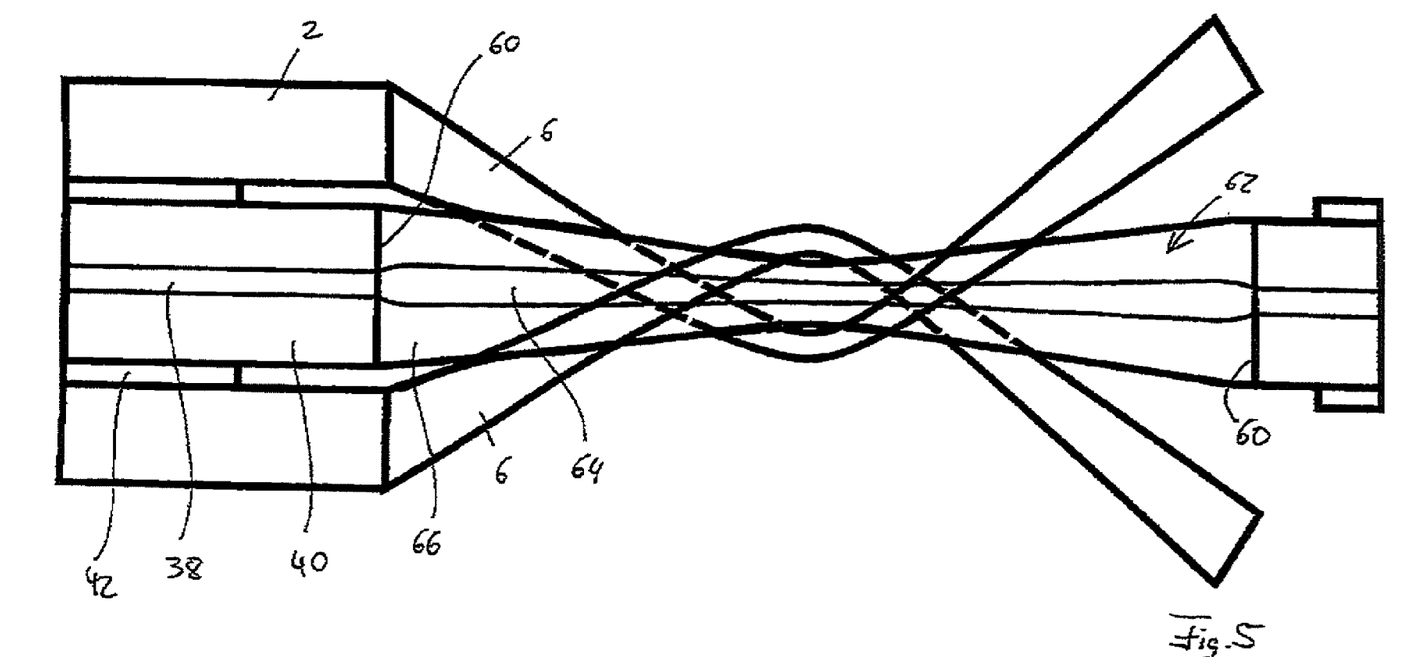
FIG. 5 shows a schematic side view of a coupling arrangement according to yet another embodiment of the present invention.

FIG. 5 shows a schematic view on a coupling arrangement according to another embodiment of the present invention. It shows a target fiber 20 and two feeding fibers 2. At the output ends 4 of both feeding fibers 2 an intermediate fiber 6 is spliced to the feeding fiber 2.

The target fiber 20 comprises two cutting surfaces 60, at which the original target fiber 20 has been cut in order to insert an adapted fiber 62. The target fiber 20 in the right and the left part of FIG. 5 comprises a core 38 and a cladding 40 and a coating 42. The adapted fiber 62 comprises an adapted fiber core 64 and an adapted fiber cladding 66. As shown in FIG. 5 the adapted fiber core 64 of the adapted fiber 62 has a larger diameter, which in the schematic also means a larger mode field diameter than the core 38 of the target fiber 20 in the left and the right part of FIG. 5. During the manufacture of the coupling arrangement as shown in FIG. 5 the adapted fiber 62 also gets tapered. This leads to a reduced diameter of the adapted fiber 62 and also of its adapted fiber core 64. The change of the mode field diameter is not equal to the change of the core diameter depending on the numerical aperture of the core. Hence, by using an adapted fiber 62 one can weaken or even fully avoid the negative consequences of the tapering of the target fiber 20 during manufacture.

| List of reference numbers: | |
|---|---|
| 2 | feeding fiber |
| 4 | output end |
| 6 | intermediate fiber |
| 8 | input end |
| 10 | heat source |
| 12 | double arrow |
| 14 | taper portion |
| 16 | converging taper portion |
| 18 | diverging taper portion |
| 20 | target fiber |
| 22 | first mount |
| 24 | second mount |
| 26 | rotation arrow |
| 28 | first force |
| 30 | second force |
| 32 | first anchoring bond |
| 34 | second anchoring bond |
| 36 | housing |
| 38 | core |
| 40 | cladding |
| 42 | coating |
| 44 | core |
| 46 | cladding |
| 48 | coating |
| 50 | coating |
| 52 | gap |
| 54 | final end |
| 56 | mirror element |
| 58 | mode mixing element |
| 60 | cutting surface |
| 62 | adapted fiber |
| 64 | adapted fiber core |
| 66 | adapted fiber cladding |

The invention claimed is:

1. A coupling arrangement for non-axial transfer of electromagnetic radiation comprising:
   at least one feeding fiber comprising a core and at least one cladding; and
   an intermediate fiber that is a coreless fiber that is not produced by stripping a cladding from a fiber with a core;
   wherein said at least one feeding fiber is separate from said intermediate fiber and configured to transfer said electromagnetic radiation into a target fiber in a transfer region via said intermediate fiber,
   wherein said intermediate fiber comprises an input end and a converging taper portion,
   wherein said input end of the intermediate fiber is spliced to an output end of the at least one feeding fiber in an axial way, and
   wherein the converging taper portion of said intermediate fiber is fused to the target fiber in the transfer region in a non-axial way.

2. The coupling arrangement according to claim 1, wherein said intermediate fiber has a polygonal cross-section.

3. The coupling arrangement according to claim 1, wherein said intermediate fiber further comprises a diverging taper portion adjacent to said converging taper portion, and the intermediate fiber is not fused to the target fiber at its diverging taper portion such that there is a gap between said target fiber and said diverging taper portion of said intermediate fiber.

4. A coupling arrangement for non-axial transfer of electromagnetic radiation comprising:
   at least one feeding fiber to transfer said electromagnetic radiation into a target fiber in a transfer region,
   wherein said target fiber comprises a core and at least one cladding,
   wherein, in the transfer region, the target fiber is formed by an adapted fiber having an adapted fiber core and at least one adapted fiber cladding, and
   wherein the adapted fiber core of the adapted fiber has a mode field diameter, which at least in a section is larger than a mode field diameter of the target fiber outside the transfer region.

5. The coupling arrangement according to claim 4, wherein the mode field diameter of the adapted fiber core at the beginning and the end of the transfer region is larger than the mode field diameter of the adapted fiber core in a centre portion of the transfer region, while the mode field diameter of the adapted fiber core in the centre portion of the transfer region is at least as large as the mode field diameter of the core of the target fiber outside the transfer region.

6. The coupling arrangement according to claim 4, wherein the feeding fiber or an intermediate fiber, which is spliced to an output end of the feeding fiber, is fused to the target fiber in the transfer region in a non-axial way.

7. The coupling arrangement according to claim 4, wherein the adapted fiber core and/or the adapted fiber cladding is made from the same material as the core and/or the cladding of the target fiber outside the transfer region, respectively.

8. A coupling arrangement for non-axial transfer of electromagnetic radiation comprising:
   at least one feeding fiber to transfer said electromagnetic radiation into a target fiber in a transfer region,
   wherein said feeding fiber comprises an input end to be connected to a light source and an opposing final end,
   wherein an intermediate fiber, which is spliced to the final end of the feeding fiber, comprises a converging taper portion, wherein the converging taper portion of said intermediate fiber is fused to the target fiber in a non-axial way, and wherein, at the final end of the intermediate fiber, a mirror element is located.

9. The coupling arrangement according to claim 8, wherein, in the transfer region, the target fiber is formed by an adapted fiber.

10. The coupling arrangement according to claim 8, wherein a mode mixing element is located between the converging taper portion of the intermediate fiber and the mirror element.

11. The coupling arrangement according to claim 4, wherein the at least one feeding fiber has a polygonal cross-section.

12. The coupling arrangement according to claim 1, wherein said at least one feeding fiber comprises an even number of feeding fibers.

13. A method for manufacturing a coupling arrangement for non-axial transfer of electromagnetic radiation comprising at least one feeding fiber to transfer said electromagnetic radiation into a target fiber in a transfer region via an intermediate fiber, wherein said intermediate fiber comprises an input end and a converging taper portion, wherein said input end of the intermediate fiber is spliced to an output end of the feeding fiber in an axial way, and wherein the converging taper portion of said intermediate fiber is fused to the target fiber in the transfer region in a non-axial way, comprising the following steps:

mounting the target fiber and the at least one feeding fiber or the at least one intermediate fiber in a mechanical mount at two different positions;

twisting said feeding fiber or said intermediate fiber around said target fiber; and applying a first force in longitudinal direction to the feeding fiber or to the intermediate fiber and applying a second force in longitudinal direction to the target fiber, wherein the first force is different from the second force.

14. The method according to claim 13, wherein the target fiber is not twisted in said twisting step.

15. The method according to claim 13, wherein said feeding fiber or said intermediate fiber is pre-tapered being before mounted in the mechanical mount, the pre-tapering comprising the steps of:

heating said feeding fiber or said intermediate fiber; and applying a taper-force in longitudinal direction to the heated feeding fiber or the heated intermediate fiber.

16. The method according to claim 15, wherein the taper-force is applied to the feeding fiber or to the intermediate fiber using the same mount that is used for applying the first force to the feeding fiber or to the intermediate fiber.

17. The coupling arrangement according to claim 2, wherein said polygonal cross-section is a hexagonal cross-section or an octagonal cross-section.

18. The coupling arrangement according to claim 11, wherein said polygonal cross-section is a hexagonal cross-section or an octagonal cross-section.

19. A coupling arrangement for non-axial transfer of electromagnetic radiation comprising:

at least one feeding fiber to transfer said electromagnetic radiation into a target fiber in a transfer region, wherein said feeding fiber comprises an input end to be connected to a light source and an opposing final end, wherein said feeding fiber comprises a converging taper portion, wherein the converging taper portion of said feeding fiber is fused to the target fiber in a non-axial way, and wherein, at the final end of the feeding fiber, a mirror element is located.

* * * * *